3,014,827
SPRING CLOSURE FOR CYLINDRICAL PIPE INSULATION

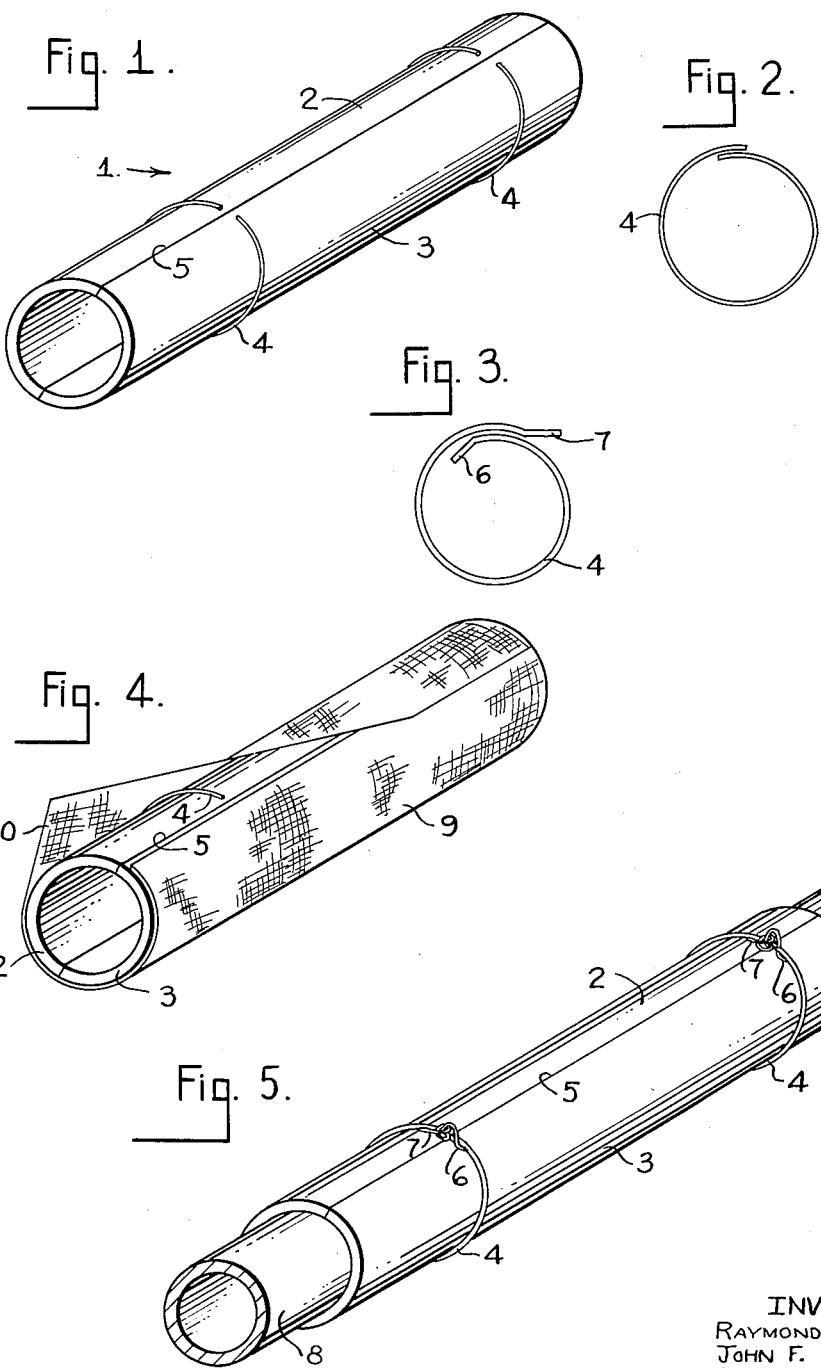

Raymond C. Clinchy, Bronxville, N.Y., John F. Stone, New Canaan, Conn., and Charles E. Ernst, Elizabeth, N.J., assignors to Johns-Manville Corporation, New York, N.Y., a corporation of New York
Filed July 9, 1958, Ser. No. 747,489
1 Claim. (Cl. 154—44)

This invention relates to a molded insulation and is particularly directed to a molded insulation for use on circular objects such as pipe. The term "molded insulation" is used to include any substantially, relatively non-resilient material such as: pipe insulations containing 85% magnesia and 15% asbestos; pipe insulations wherein specially selected and calcined diatomaceous silica is blended with other insulating materials and bonded with asbestos fibers; pipe insulations composed of hydrous calcium silicate combined asbestos fibers; and other pipe insulations possessing characteristics of this nature.

The above types of molded insulations are generally marketed in semi-cylindrical sections which are adapted to be joined together into a cylinder surrounding the pipe to be insulated. The semi-cylindrical sections may or may not be secured to a canvas jacket. The semi-cylindrical sections are separately placed into position around the pipe and held in that position until a permanent securing means is attached thereto. This plurality of operations makes the installation of such molded pipe insulation unwieldy and time consuming. However, for certain operating conditions, the above types of molded insulation are the only insulations available for the desired purpose. Therefore, the insulation industry is constantly striving for new and better methods for marketing and applying these highly desired pipe insulations.

It is an object of this invention to provide a molded pipe insulation that may be snapped into position on a pipe and resiliently retained thereon.

The foregoing object is accomplished in accordance with the instant invention by placing at least one preformed spring loop around a cylinder, composed of two semi-cylindrical sections of molded pipe insulation. Each preformed spring loop has a normal diameter less than the outside diameter of the molded pipe insulation, and the length of each preformed loop is itself less than the outside circumference of the molded pipe insulation. The spring loops cooperate to hold the semi-cylindrical sections in cylindrical form so that the semi-cylindrical sections can be opened along one seam line and snapped into position around the pipe and, also, provide the required force to close the opened semi-cylindrical sections into a cylindrical form around the pipe after placement thereon.

The invention will be more fully understood and further objects and advantages thereof will become apparent when reference is made to the following detailed description of a preferred embodiment of the invention and the accompanying drawings in which:

FIG. 1 is a pictorial representation of a molded pipe insulation in accordance with the instant invention;
FIG. 2 is a side elevation of a spring loop;
FIG. 3 is a side elevation of a spring loop provided with untempered ends;
FIG. 4 is a pictorial representation of a molded pipe insulation with a canvas jacket thereon; and
FIG. 5 is a pictorial representation of a molded pipe insulation in position around the pipe and retained in position thereon by spring loops having untempered ends as illustrated in FIG. 3.

Referring to the drawing there is disclosed in FIG. 1 a molded pipe insulation 1 comprising the semi-cylindrical sections 2 and 3. The cylindrical pipe insulation is formed by placing the free longitudinal edges of the semi-cylindrical sections 2 and 3 in contiguous relationship and is retained in such relationship by a pair of spring loops 4 which partially encircle the cylinder formed by the semi-cylindrical sections. As illustrated in FIGS. 2 and 3, each spring loop 4 is formed on a diameter that is less than the outside diameter of the pipe insulation for which it is designed so that the spring loop is under a predetermined tension when applied to a pair of semi-cylindrical sections 2 and 3. The length of each spring loop 4 is slightly less than the outside circumference of the molded insulation to which it is to be applied. When properly positioned about the cylinder formed by the two semi-cylindrical sections 2 and 3, the spring loop 4 leaves a free uninterrupted slit 5 along one set of the contiguous longitudinal edges. The cylindrical pipe insulation, formed by the semi-cylindrical sections 2 and 3 and retained in cylindrical form by the spring loops 4, is thus adapted to be opened along the slit 5 and snapped into position around a pipe. The spring loops 4 are under sufficient tension to maintain the adjacent longitudinal edges of the semi-cylindrical sections 2 and 3 in close contiguous relationship after the cylindrical pipe insulation is in position around the pipe.

In FIG. 3 there is illustrated a spring loop 4 having untempered ends 6 and 7. The untempered ends 6 and 7 are of sufficient length so that they may be twisted about each other to form a positive securement after the two cylindrical sections 2 and 3 have been snapped into position around the pipe. A final pipe insulation provided with spring loops 4 having untempered ends 6 and 7 is shown in positive securement to a pipe 8 in FIG. 5.

The pipe insulation formed by the semi-cylindrical sections 2 and 3 and retained in contiguous relationship by the spring loops 4 may be jacketed in a canvas envelop or jacket 9. In FIG. 4, the semicylindrical sections 2 and 3 are secured to a canvas jacket 9 which is provided with a sealing flap 10 which overlaps the slit 5. After the insulation has been positioned around the pipe, the flap 10 is secured to the other portion of the canvas jacket so that the flap 10 covers the slit 5. As illustrated in FIG. 4, the canvas jacket 9 is used with spring loops 4 but may also be used with spring loops 4 having the untempered ends 6 and 7.

The instant invention is particularly adapted for use with pipe insulations of the molded type particularly for semi-cylindrical sections marketed by commercial concerns as staple articles of commerce under various trademarks, such as: "Fibrocel," a molded silicate insulation formed by expanding a silica aggregate; "Thermobestos," a molded insulation made by a special process and composed of hydrous calcium silicate combined with asbestos fiber; "Superex," a molded insulation manufactured by blending specially selected and calcined silica with other insulating materials and bonded with asbestos fiber; and 85% magnesia, a molded insulation principally comprising 85% magnesia and 15% asbestos.

In accordance with the instant invention, two semi-cylindrical sections, having a wall thickness of 1 inch, of molded pipe insulation, identified above as sold under the trademark "Fibrocel," were retained in a cylindrical form having an outside diameter of 4⅝ inches and an inside diameter of 2⅝ inches by a pair of spring loops each having a diameter of 3/32 of an inch and a length of 13 inches. The spring loops 4 were tempered so that they exerted a retaining force of approximately 4 lbs. when the adjacent longitudinal edges of the semi-cylindrical sections forming the slit 5 were in close contiguous relationship. The linear distance between the adjacent free ends of each spring loop when in position about the semi-cylindrical sections 2 and 3 was approximately 1½ inches. The above explanation is given for purposes of illustration only, and it is not intended to limit the invention thereto. Thus, the spring loops 4 may be broad-surfaced spring metal bands. The retaining force applied by the spring loops 4 need only be of sufficient force to hold the adjacent longitudinal edges of the semi-cylindrical sections in close contiguous relationship. As illustrated in FIG. 5, for positive securement the spring loops 4 have untempered ends 6 and 7 which may be twisted about each other to exert any desired retaining force along the slit 5. If desired, other means for positive securement may be used and such means are intended to fall within the scope of the instant invention.

Having thus described the invention in rather full detail, it will be understood that these details need not be strictly adhered to and that various changes and modifications may suggest themselves to one skilled in the art, all falling within the scope of the invention as defined by the subjoined claim.

What we claim is:

A molded pipe insulation comprising a pair of mating semi-cylindrical sections of molded pipe insulation, said semi-cylindrical sections being adapted to be positioned with their longitudinal edges in contiguous relationship to form a cylindrical pipe insulation, at least one spring loop partially encircling said semi-cylindrical sections so that said formed cylindrical pipe insulation has one free uninterrupted slit along one pair of adjacent longitudinal edges, said spring loop being adapted to allow said semi-cylindrical sections to be opened along said uninterrupted slit so that said semi-cylindrical sections may be snapped into position around the pipe, said spring loop being further adapted to retain said semi-cylindrical sections in position around said pipe with said longitudinal edges in contiguous relationship, and means associated with the ends of said loops for positively securing said semi-cylindrical section together, said means comprising untempered ends integral with said spring loop, said untempered ends being of sufficient length so that they may be twisted about each other to secure positively the semi-cylindrical sections.

References Cited in the file of this patent

UNITED STATES PATENTS

| | | |
|---|---|---|
| 234,417 | Merriam | Nov. 16, 1880 |
| 273,689 | Kelly | Mar. 6, 1883 |
| 785,822 | Mitchem | Mar. 28, 1905 |
| 1,762,276 | Schreier | June 10, 1930 |
| 2,160,009 | Walker | May 30, 1939 |
| 2,650,180 | Walker | Aug. 25, 1953 |

FOREIGN PATENTS

| | | |
|---|---|---|
| 810,901 | Germany | Aug. 13, 1951 |